INVENTOR
DARYL G. STREIF

Sept. 8, 1970   D. G. STREIF   3,528,060
TIME VARIABLE STOP BIT SCHEME FOR DATA PROCESSING SYSTEM
Filed June 20, 1968   8 Sheets-Sheet 2

0-7 = DATA BITS
STR = START BIT

STR = START BIT
0-7 = DATA BITS
STP = STOP BIT

1½ BIT TIME
STOP BIT
TIME
DURATION
MINIMUM

2 BIT TIME
STOP BIT TIME
DURATION
MINIMUM

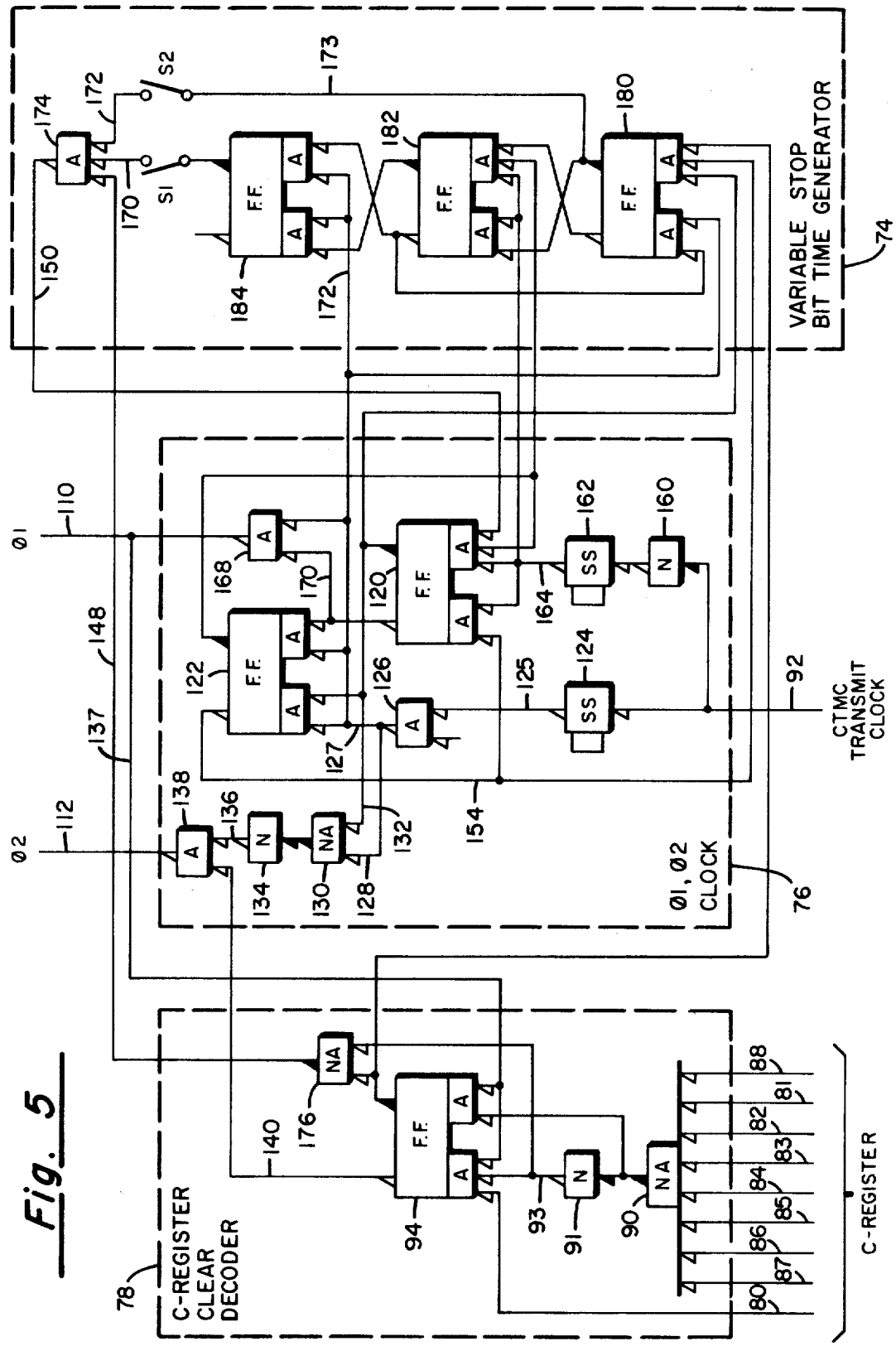

United States Patent Office 3,528,060
Patented Sept. 8, 1970

1

3,528,060
TIME VARIABLE STOP BIT SCHEME FOR
DATA PROCESSING SYSTEM
Daryl G. Streif, St. Paul, Minn., assignor to Sperry
Rand Corporation, New York, N.Y., a corporation of
Delaware
Filed June 20, 1968, Ser. No. 738,483
Int. Cl. H04j 3/06
U.S. Cl. 340—172.5                              7 Claims

ABSTRACT OF THE DISCLOSURE

A scheme for providing selectively variable Stop bit time durations in information transfer between computer sites in a multi-computer data processing system. The scheme involves the addition of a logical circuit to an already existing Communication Terminal Module whereby the time duration of the synchronizing Stop bit, which is transmitted as the last bit in each multi-bit character of a multi-character message between computer sites, is selectively established at one of a plurality of bit times. The Stop bit duration is selected to accommodate the reaction time of the receiving computer site.

BACKGROUND OF THE INVENTION

The present invention is directed toward a multi-computer data processing system operating in real time wherein a plurality of independently operable Remote Computers (RC), at a plurality of Remote Sites, communicate with an independently operable Central Computer (CC), at a Central Site. At the transmitting computer site, intermediate the computer and its communication link with other computer sites, there exists a Communication Terminal Module Controller (CTMC) and a plurality of parallel coupled Communication Terminal Modules (CTM) which, under control of the associated computer, receive information in a character serial, character bit parallel message format from the associated computer, and acting upon such information transmit such information in a character serial, character bit serial bit message format between themselves and their associated communication link. A similar arrangement exists at the receiving computer site whereby the information is reconverted from the character serial, character bit serial message format and is coupled to the associated computer in the character serial, character bit parallel message format.

In such a system each computer may be coupled in parallel through their associated Communication Terminal Module Controller to up to 16 Communication Terminal Modules and their associated transmission lines with the information that is to be transmitted being gated into only one of the parallel arranged Communication Terminal Modules. Each Communication Terminal Module includes a transmit and receive, i.e., output and input, Communication Terminal (CT) interconnected in a pair to provide half or full duplex communication, as required. Such communication may be selectively by simplex or duplex data transmission via a communication path such as a telegraph or telephone line or other communication facility. A wide variety of transmit and receive Communication Terminals provide features and selections appropriate for communication via most available communication facilities and methods. Such Communication Terminals are generally classified by speed and method of communication. For a more detailed discussion of such available communication methods see the copending patent application of R. C. Jablonski, Ser. No. 733,544, filed May 31, 1968, assigned to the Sperry Rand Corporation as is the present invention.

2

The present invention relates in particular to a low speed Communication Terminal Module which is composed of two full duplex Communication Terminals described as the input Communication Terminal and the output Communication Terminal. The low speed Communication Terminal Module is designed as an input/ and/or output device that provides the terminal connections between a communication link in a computer input/output channel via the associated Communication Terminal Module Controller. The low speed Communication Terminal Module is an asynchronous communication device which receives information from the associated computer in an information message format consisting of a plurality of multi-bit characters. The Communication Terminal Module receives the information in a character serial, character bit parallel message format from the associated computer and transmits it to the receiving computer site over its associated communication link in a character serial, character bit serial message format. In the transmission system of the prior art into which the present invention is incorporated the message format of the illustrated embodiment consists of the initial transmission, from the transmitting site to the receiving site, of a start of message (SOM) character which is immediately followed by a series of (DATA) characters which, in turn, are immediately followed by an end of message (EOM) character and terminated by an end of transmission (EOT) character whereby the data to be transmitted between the transmitting and receiving sites are fully defined. The receiving computer identifies and reacts uniquely for each of the various character forms of the received message.

In prior art systems, as in the Communication Terminal Module into which the present invention is incorporated, each multi-bit character was received in a character serial, character bit parallel message format from the associated Communication Terminal Module and coupled to the associated transmission line in a character serial, character bit serial message format. As the Communication Terminal Module is an asynchronous device the transmitting Communication Terminal preceded the transmission of the data bits of each character by a Start bit and terminated the transmission of the data bits of each character by a Stop bit whereby the receiving Communication Terminal, at the receiving site, is enabled to assemble the character bit serial information into a multi-bit character of the proper bit orientation and transmit the assembled multi-bit character in a character bit parallel format to the associated receiving computer. As each receiving site may have differing limitations as to the time capability of assembling the multi-bit character and as to performing the necessary operations thereon it was, in the prior art, necessary to provide alternative timing arrangements for providing sufficient Stop bit time durations between receipt of consecutive multi-bit characters, in terms of multiple character bit times, to permit the receiving site to accommodate the receipt and transmission of consecutive multi-bit characters of the multi-character information message format. These differing timing systems in the transmitting Communication Terminal Module may involve elaborate clocking devices for accommodating the reaction time of the receiving computer site. Thus, it was necessary in the prior art Communication Terminal Modules to provide elaborate timing systems for the assurance of accurate transmission of information messages when transmitted in a character serial, character bit serial message format. The present invention relates to a scheme whereby a machine operator at the transmitting site may select one of a plurality of Stop bit time durations so as to accommodate the particular reaction time of the receiving computer site.

SUMMARY OF THE INVENTION

The present invention relates to a scheme for providing selectively variable Stop bit time durations in information transfer between computer sites in a multi-computer data processing system. The scheme involves the addition of logical circuitry to an already existing Communication Terminal Module whereby the time duration of the synchronizing Stop bit, which is transmitted as the last bit in each character of a multi-bit character of a multi-character message between computer sites, is selectively established at one of a plurality of bit times so as to accommodate the reaction time of the receiving computer site. The logical circuitry involves the coupling, by patch card, switch, etc., of a variable Stop bit time generating circuit into an already existing transmitting clock bit time generating circuit for varying the Stop bit time duration over a plurality of increasing bit times as may be required by different operating speed receiving sites.

BRIEF DESCRIPTION OF THE DRAWINGS

FIG. 5 is an illustration of a block diagram of a preferred embodiment of a variable Stop bit time generating circuit of the present invention that may be utilized to control the Stop bit time duration of the multi-bit character of FIG. 2b as emitted from the Shift Register system of FIG. 4.

FIGS. 7a–7h, 7j–7n, 7p are block diagrams, and their associated truth tables, of the logic circuits utilized in FIGS. 4, 5.

DESCRIPTION OF THE PREFERRED EMBODIMENT

Figure 1:
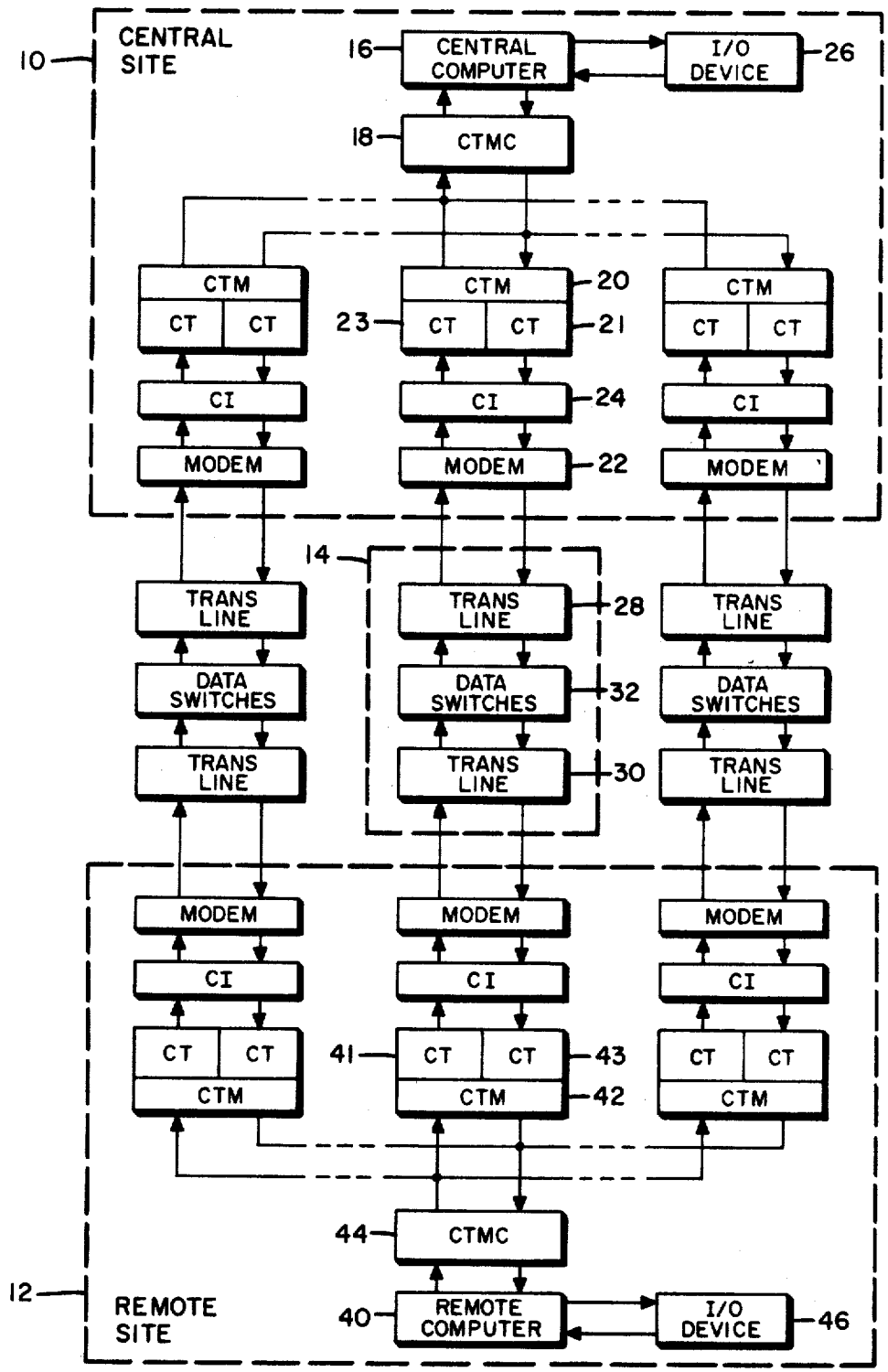
FIG. 1 is a block diagram of a data processing system in which the present invention is incorporated.

With particular reference to FIG. 1 there is presented a block diagram of a data processing system whereby a plurality of Remote Computers (RC), at a plurality of Remote Sites, communicate with each other and with a Central Computer (CC), at a single Central Site, over respectively associated communication links comprised of a variety of transmission line types. Transmission is bidirectional whereby each independently operable computer has selective ready access, on a real time basis, to each of the other independently operable computers.

The illustrated embodiment of FIG. 1 is broadly composed of a Central Site 10 coupled to a plurality of Remote Sites 12 by their respectively associated Transmission Lines 14. Central Site 10 includes Central Computer (CC) 16, which may be a Univac 9200 computer, a Communication Terminal Module Controller (CTMC) 18, which may be a Univac Communication Terminal Module Controller T8236, which is coupled in parallel to a plurality of Communication Terminal Modules (CTM) 20 each of which may be a Univac low speed Communication Terminal Module VI. Input/Output (I/O) Devices 26, 46 may include a card punch/reader, line printer, typewriter, paper tape punch/reader, magnetic drum, etc. Intermediate Communication Terminal Module 20 and its associated Transmission Line 14 there may be a Modem 22, such as a Bell System 108C Data Set, and a Communication Interface (CI) 24 which may be a Univac Communication Interface F 1002–03 which couples the Central Site 10 to its respectively associated Transmission Line 14. Transmission Line 14 is a 4-wire transmission line system leased from the Bell Telephone Company System and includes at least two transmission line portions 28, 30 implemented by a Bell System 758C Data Switcher 32. Broadly speaking, all of the sites 10, 12 may be of substantially similar equipment make-up except for variations in the Communication Terminal Module requirements due to the peculiarities of the associated mesage format and transmission line requirements. Such variations in the Communication Terminal Module requirements, due to the peculiarities of the associated message format and transmission line requirements, are more fully discussed in the above referenced copending patent application of R.C. Jablonski.

The data processing system of FIG. 1 is a duplex, asynchronous real time communications link transmitting data at an asynchronous data rate of up to 300 bits per second (baud) simplex. Information, in the illustrated embodiment, is transmitted in the character forms; start of message (SOM) character, data (DATA) character, end of message (EOM) character, end of transmission (EOT) character, and is character serial between Central Computer 16 and Remote Computer 40 in the message format of FIG. 3. Transmission between Central Computer 16 and Communication Terminal Module 20 and between Remote Computer 40 and Communication Terminal Module 42 is character bit parallel while transmission between Communication Terminal Module 20 and Communication Terminal Module 42 is character bit serial. As stated above, the data processing system of FIG. 1 is an existing system into which the time variable Stop bit scheme of the present invention is incorporated. The present invention relates to the operation of the circuitry of FIGS. 4, 5 in the Communication Terminal Module 20, 42 of sites 10, 12. Accordingly, discussion hereinafter shall be primarily directed toward the operation of Central Site 10 with particular reference to Communication Terminal Module 20.

Communication Terminal Module Controller 18 is a duplex communication line terminal which provides a real time communication link between Central Computer 16 and Transmission Line 14 by way of Communication Terminal Module 20, Data Set 22 and Communication Interface 24 whereby information is transmitted to Remote Computer 40 over a leased Transmission Line 14. Data Set 22 is a standard item of a Bell Telephone Company data communication system, and, consequently, no detailed discussion of the operation of Data Set 22 shall be given herein. For purposes of the present invention it is sufficient to state that Data Set 22 emits a frequency modulated signal on Transmission Line 14 as a function of a digital input.

Figure 2A:
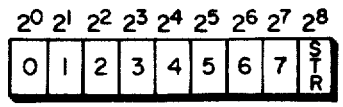
FIGS. 2a, 2b are illustrations of multi-bit character formats that are utilized by the illustrated embodiment of the present invention.
Figure 2B:
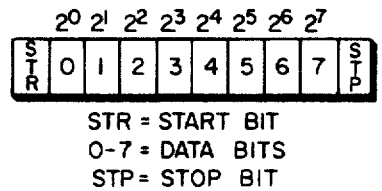
Figure 3:
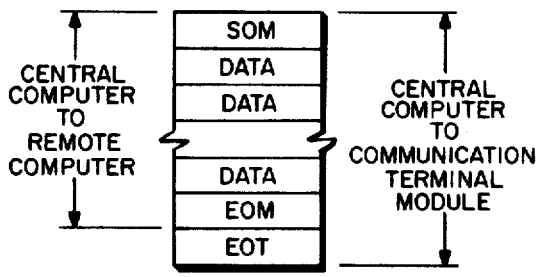
FIG. 3 is an illustration of a multi-character information message format that is utilized by the illustrated embodiment of the present invention.

Transmission over Transmission Line 14 is in an asynchronous rate at the rate of up to 300 bits per second (simplex), as controlled by Central Site 10 and/or Remote Site 12, in the message format of FIG. 3. Communication between Central Computer 16 and Communication Terminal Module 20, by way of Communication Terminal Module Controller 18, is in a character serial, character bit parallel message format in the $n$-bit character format illustrated in FIG. 2a. The character format from left to right, consists of a 9-bit byte: a Start (STR) bit ($2^8$); and the 8 data bits ($2^7$–$2^0$), where bit 0 ($2^0$) is the highest ordered or most significant bit, and bit 7 ($2^7$) is the lowest ordered, or least significant bit of the data character. Transmission between Communication Terminal Module 20 and Data Set 22 (and, accordingly, Communication Terminal Module 42) is in a character serial, character bit serial message format in the $m$-bit, e.g., $n+1$, character format of FIG. 2b. The 10-bit byte format of FIG. 2b is identical to that of FIG. 2a except that Stop (STP) bit has been added by Communication Terminal Module 20 to the 9-bit byte format of FIG. 2a at the end of the character in the $2^8$ bit position and the Start bit has been placed at the beginning of the character.

As stated above, the present invention is particularly directed toward a scheme for providing selectively variable Stop bit time durations in information transfers between computer sites in a multi-computer data processing system. The scheme involves the addition of a variable Stop bit time generating logical circuit to an already existing Communication Terminal Module 20. The illustrated embodiment of the present invention is particularly directed toward an asynchronous operation. Accordingly, each of the multi-bit characters, as transmitted over Transmission Line 14 in the 10-bit byte character format of FIG. 2b in a character bit serial transmission, is preceded by a Start bit ($2^8$) and is terminated by a Stop bit; the message character being transmitted bit serially starting with Start bit $2^8$ followed by the data bits $2^0$, $2^1$, $2^2$, $2^3$, $2^4$, $2^5$, $2^6$, $2^7$ and terminated by the Stop bit. Accordingly, it is the function of the Start bit ($2^8$) and the Stop bit, each occurring at the beginning and the end, respectively, of the multi-bit character, to synchronize the receiving Communication Terminal Module 42 for assembling the received multi-bit character in the proper bit order for its subsequent transmission to the receiving Communication Terminal Module Controller 44 in the character bit format of FIG. 2a.

As data transmission is to be achieved at the maximum rate of the transmitting and receiving equipment utilized which, in the illustrated embodiment utilizes a Univac low speed Communication Terminal Module VI as Communication Terminal Module 20, is at a transmission rate of up to 300 bits per second it is desirable that timing between the transmitting and receiving sites be optimized whereby the time between the consecutive character serial transmission in a character bit serial format, herein defined as the Stop bit time, be reduced to a minimum. With each bit of each multi-bit character being transmitted from the transmitting site to the receiving site at a 1 bit time, which in the illustrated embodiment would be $\frac{1}{300}$ of a second, it is apparent that optimum transmission would be achieved by having a Stop bit time equal to the time between the transmission of consecutive data bits of the multi-bit character, e.g., 1 bit time. However, due to the limitations inherent in asynchronous transmission as utilized in the illustrated embodiment, such as the time required to detect the Start and Stop bits, assemble the multi-bit character in a serializer and transfer the assembled multi-bit character, character bit parallel into a more permanent memory element or for character print out, it is necessary to provide selectively variable Stop bit times, i.e., time durations between the leading edge of a Stop bit in a first message character and the leading edge of the Start bit in the next succeeding message character, so as to accommodate the reaction time of the receiving computer site or possible variations in the delay provided by the associated transmission line. Accordingly, it is desirable that there be provided a means whereby a computer operator, at a computer site such as Central Site 10, knowing the characteristics of a computer site to which he is to transmit a message, such as Remote Site 12, may select the optimum Stop bit time for a particular transmission operation, as for example print out on a line-a-time printer. The present invention is directed toward the addition of logical circuitry to an already existing Communication Terminal whereby the time duration of the synchronizing Stop bit, which is transmitted as the last bit in each character of a multi-bit character of a multi-character message between computer sites, is selectively established at one of a plurality of bit times of consecutive data bits of the multi-bit character. In the illustrated embodiment the selectively variable Stop bit time durations are 1 bit time, 1½ bit time, and 2 bit time. However, it is to be understood that no limitation to such precise Stop bit times is intended, it having been determined that such Stop bit time durations are sufficient to accommodate the time variations of the illustrated embodiment of FIG. 1.

Figure 4:
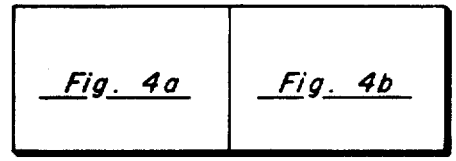
FIG. 4, including
Figure 6B:
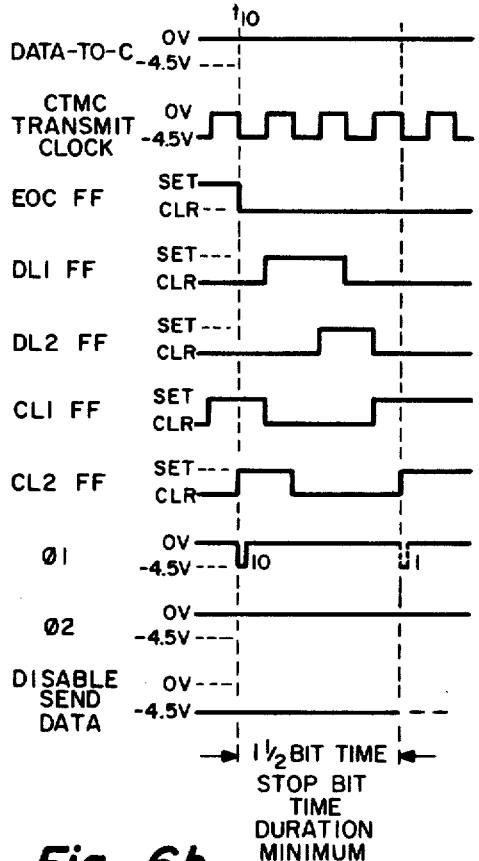
FIGS. 6a, 6b, 6c are illustrations of the timing diagrams utilized with the operation of the block diagrams of FIGS. 4, 5 for the generation of 1 bit, 1½ bit, 2 bit Stop bit time durations, respectively.
Figure 6C:
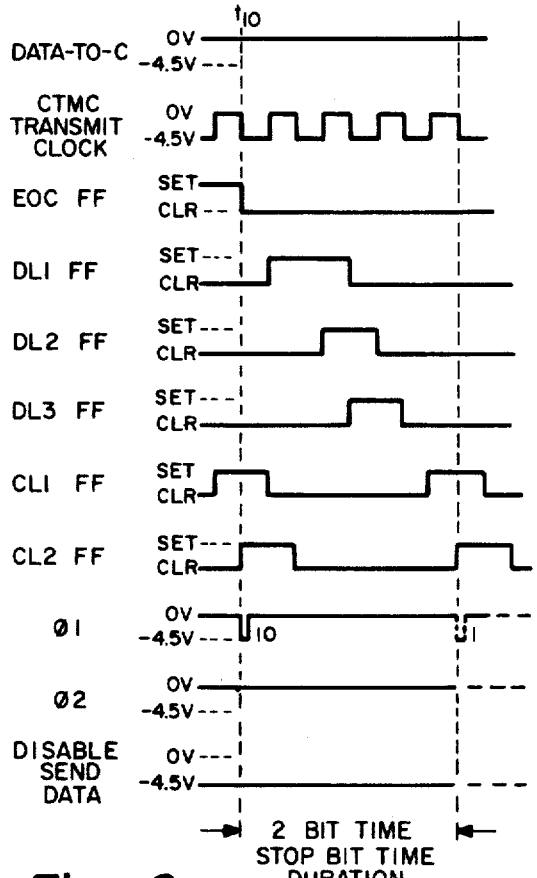
Figure 4A:
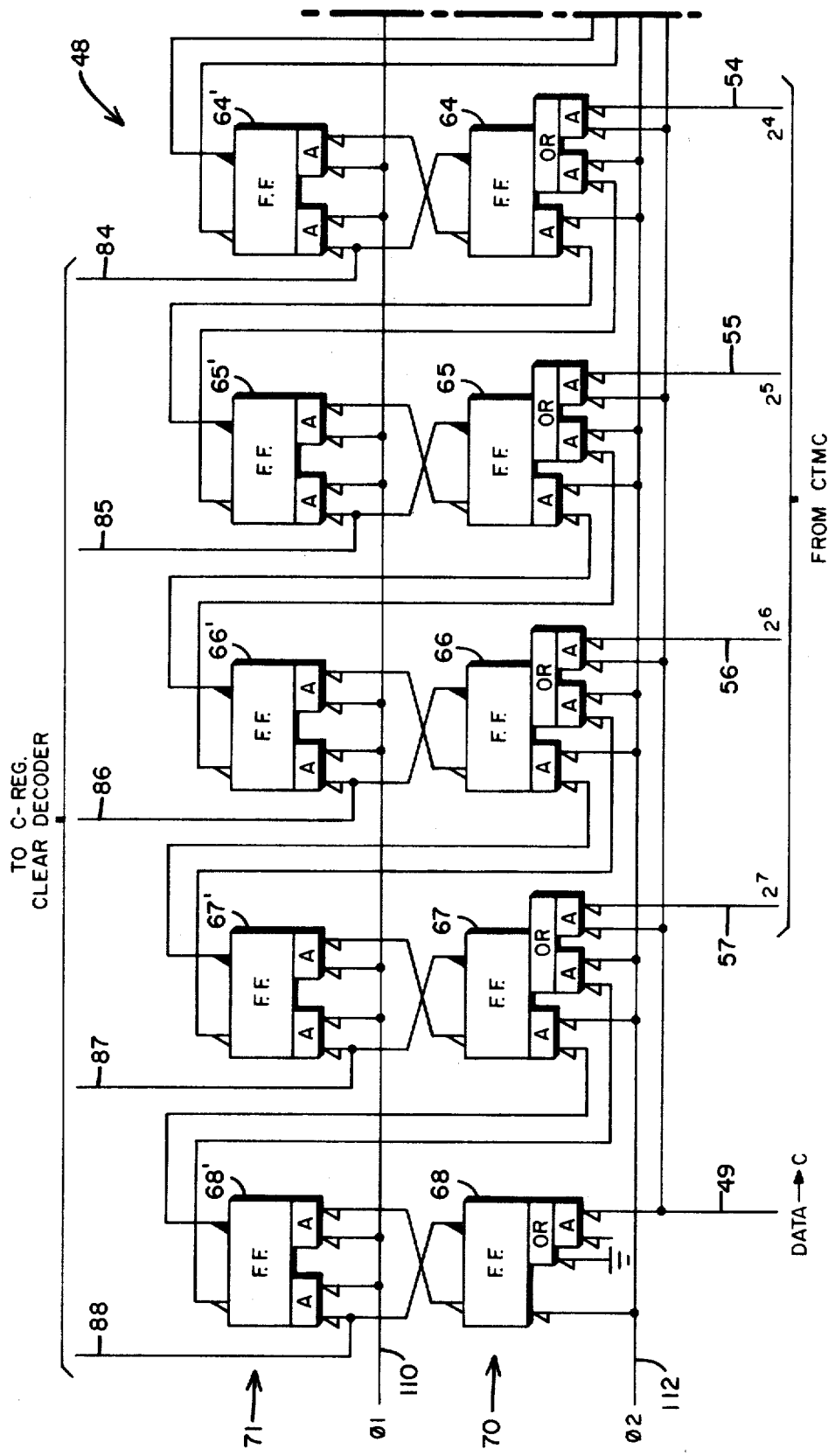
FIGS. 4a, 4b, is an illustration of a block diagram of a preferred embodiment of a Shift Register system of the present invention to character bit serially couple the multi-bit character of FIG. 2b to an associated transmission line.
Figure 4B:
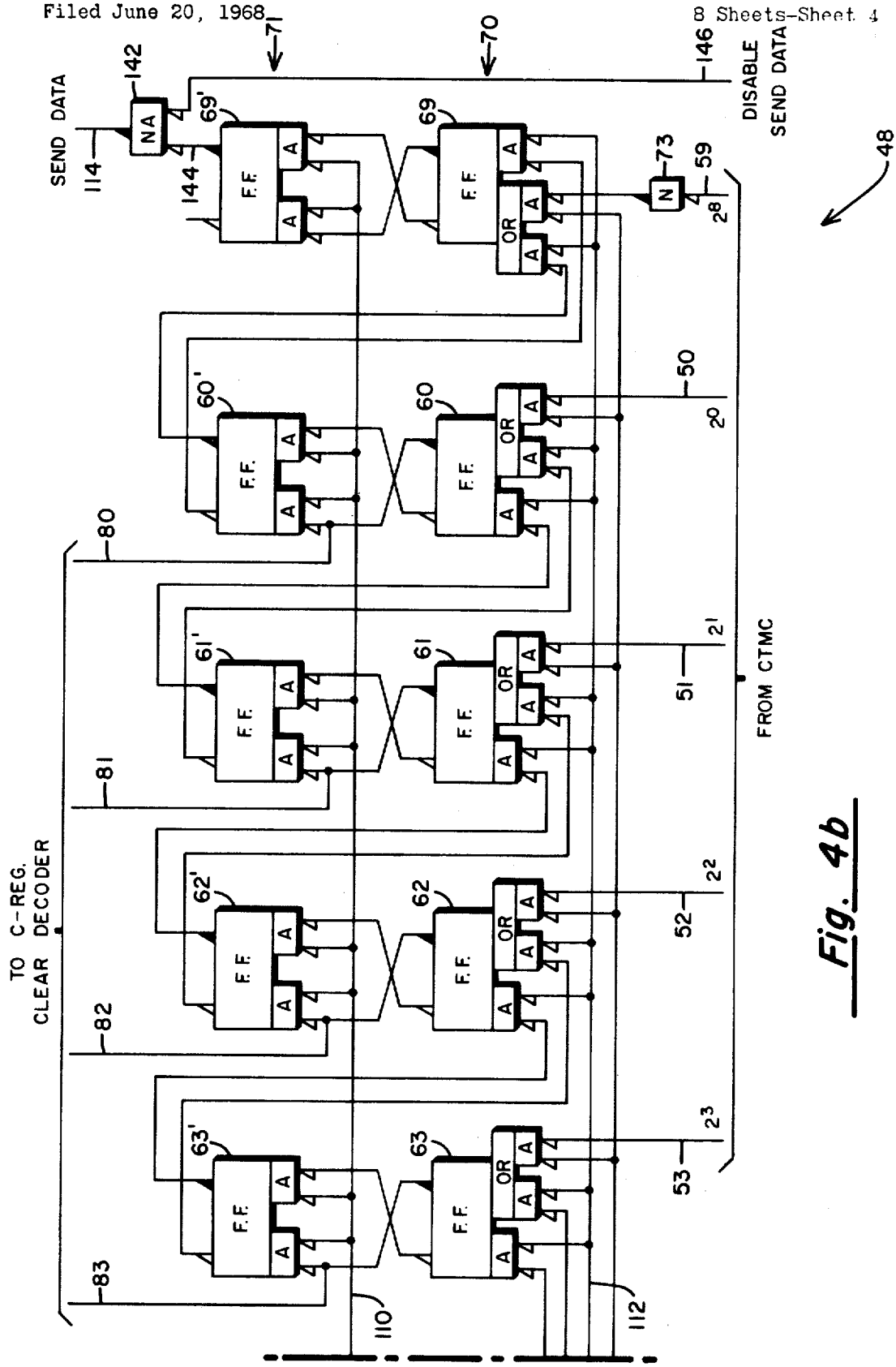
Figure 6A:
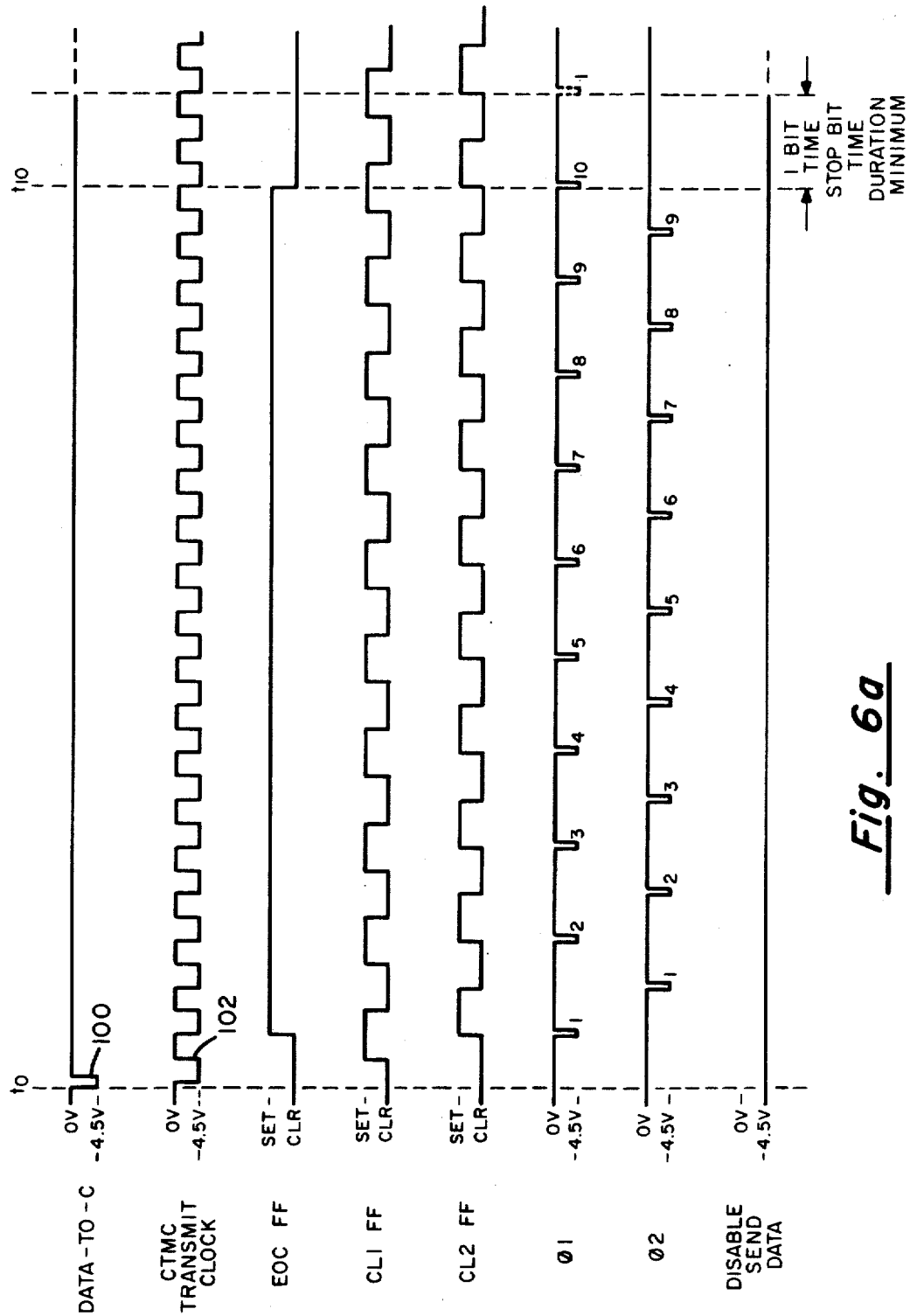
Figure 7A:
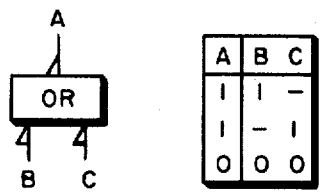
Figure 7B:
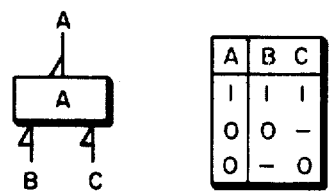
Figure 7C:
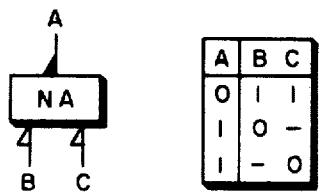
Figure 7D:
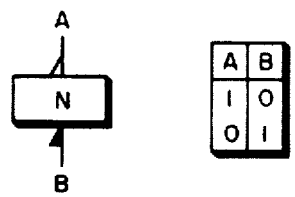
Figure 7E:
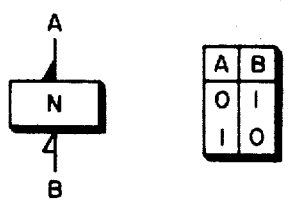
Figure 7F:
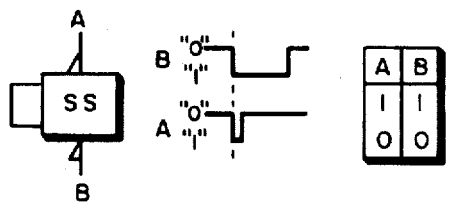
Figure 7G:
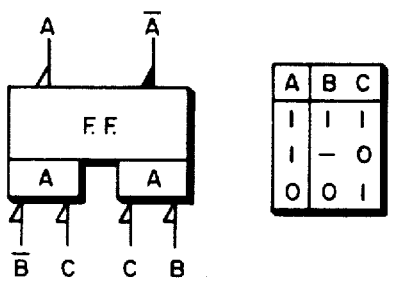
Figure 7H:
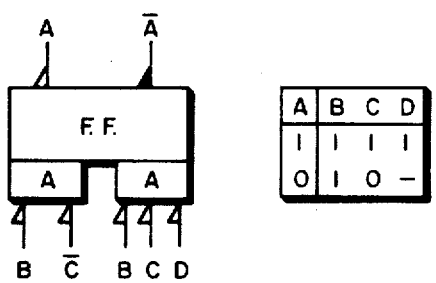
Figure 7J:
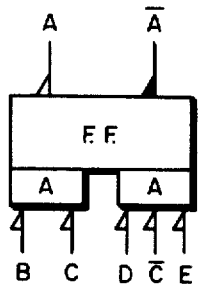
Figure 7M:
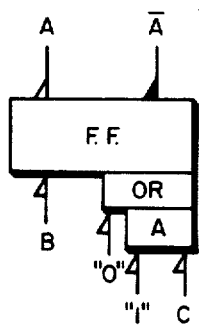
Figure 7K:
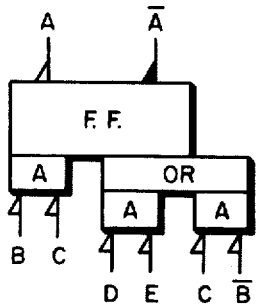
Figure 7N:
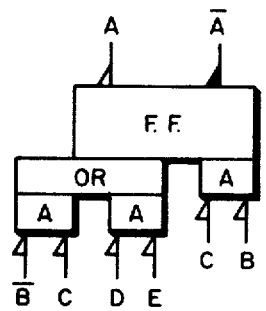
Figure 7P:
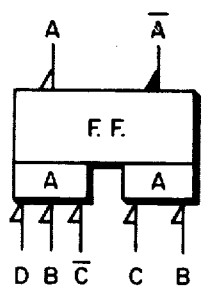

With particular reference to FIGS. 4, 5 and 6 there are illustrated the block diagrams and the timing diagrams of logical circuitry that is incorporated within Communication Terminal 21 for an implementation of the present invention. As stated above, the present invention involves a scheme for providing selectively variable Stop bit time durations in information transfer between computer sites in a multi-computer data processing system. The logical circuitry of FIG. 5 when combined with the logical circuitry of FIG. 4 and when operated in accordance with the timing diagrams of FIGS. 6a, 6b, 6c provide a plurality, e.g., 3, of variable Stop bit time durations, e.g., 1 bit time, 1½ bit time, 2 bit time, under control of the computer operator, e.g., by the closing, or the nonclosing, of 2 Switches S1, S2 at the transmitting site, as determined by the different operating speed receiving capabilities of the receiving site.

As stated hereinabove Communication Terminal Module 20 is comprised of two Communication Terminals 21, 23 for full duplex operation; output Communication Terminal 21 and input Communication Terminal 23. As the present invention is particularly directed toward a scheme for providing selectively variable Stop bit time durations in information transfer between a transmitting site and a receiving site, the means for selecting one of the plurality of variable Stop bit time durations is incorporated in the output Communication Terminal 21. Accordingly, detailed discussion of the present invention shall be particularly directed toward the operation of the output Communication Terminal 21 and its inter-relationship with the existing multi-computer data processing system.

For purposes of the present invention output Communication Terminal 21 may be considered to perform the following functions:

(a) Responds to a specific External Function Word originating in Computer 16 requesting Communication Terminal 21 to assume a "ready condition."

(b) Generates a Request For Service signal that is coupled to Communication Terminal Module Controller 18 and Computer 16.

(c) Upon receipt of an Output Acknowledge signal from the Communication Terminal Module Controller 18 stores the output character from Communication Terminal Module Controller 18 in its shift register serializer and drops the Request For Service signal. The output character (Data bits $2^0$–$2^7$, Start bit $2^8$) is received character bit parallel from Communication Terminal Module Controller 18.

(d) Communication Terminal 21 serializes the output character bit configuration as timed by Communication Terminal Module Controller 18 transmit clock.

(e) Communication Terminal 21 generates and times the Stop bit for each SOM, DATA, EOM output character received from Communication Terminal Module Controller 18.

(f) At the beginning of each Stop bit time, Communication Terminal 21 couples a Request For Service signal to Communication Terminal Module Controller 18.

(g) Communication Terminal 21 continues to request output characters at the beginning of each successive Stop bit time until the End Of Transmission (EOT) character is received.

(h) Communication Terminal 21, upon receipt of the End Of Transmission (EOT) character, stops coupling a Request For Service signal to Communication Terminal Module Controller 18 until Communication Terminal 21 receives another External Function Word from Communication Terminal Module Controller 18 requesting Communication Terminal 21 to again assume a ready condition.

Discussion of the operation of the circuitry of FIGS.

4, 5 shall now proceed assuming that Communication Terminal 21 is in the ready condition, i.e., ready to receive the first output character from Communication Terminal Module Controller 18 with C Register 70 of Shift Register 48 being cleared to store all "0's" by a previous shift operation. (Note, when discussing the operation of FIGS. 4, 5 to set a flip-flop or register stage shall mean that a "1" shall be emitted from its left-hand output line indicative of the storing of a "1" while to clear a flip-flop or register stage shall mean that a "0" shall be emitted from its left-hand output line indicative of the storing of a "0.") At this time the data bits of the output character, bits $2^0$–$2^7$, are coupled to the input lines 50–57, respectively, of Shift Register 48. Concurrently, Communication Terminal Module Controller 18 couples a "DATA-to-C" signal to line 49 which signal gates bits $2^0$–$2^7$ of the output character into Stages 60–67 of C Register 70. Concurrently, Stage 68 of C Register 70 is set, i.e., stores a "1." Stage 68 of C register 70 is then defined as being set to store a Marker bit. When the Marker bit is shifted through Shift Register 48 into Stage 69 of C Register 70 the Marker bit then becomes the Stop bit. Simultaneously with the coupling of the DATA-to-C signal to line 49, bit $2^8$ of the output character, a "0," is coupled to line 59 through Inverter 73 whereby Stage 69 of C Register 70 is cleared, i.e., stores a "0." Thus, after the DATA-to-C operation, i.e., the loading of C Register 70, Stages 60–67 of C Register 70 store bits $2^0$–$2^7$ of the output character, Stage 68 of C Register 70 stores a "1" Marker bit and stage 69 of C Register 70 stores a "0" Start bit.

With C Register 70 now loaded, i.e., after the DATA-to-C operation, the set sides of Stages 60–68 of C Register 70 through lines 80–88 couple the set outputs of the respectively associated stages to C Register Clear Decoder 78 at AND Inverter 90—see FIG. 5. With C Register 70 loaded, the C Register Clear Decoder 78 detects, at least, the set Stage 68 of C Register 70. Set Stage 68 of C Register 70 through line 88 causes AND Inverter 90 and Inverter 91 to couple a negative, i.e., "1," signal to the set side of Enable Output Clock (EOC) Flip-Flop 94 at line 93. All of the above has occurred during the DATA-to-C operation.

With particular reference to FIG. 6a there is presented an illustration of a timing diagram that will be utilized to explain the operation of the block diagrams of FIGS. 4, 5. The signal waveforms of FIG. 6a may be considered to be time-relative with respect to a time $t_0$ which is concurrent with the initiation of the DATA-to-C pulse 100. Time $t_0$ will be considered to be the initiation of the operation of the circuitry of FIGS. 4, 5. Additionally, FIG. 6a illustrates the CTMC transmit clock waveform which consists of a 50% duty cycle series of clock pulses 102 which provide the basic timing for Communication Terminal Module 20 and which are coupled to Communication Terminal 21 at wire 92—see FIG. 5. Additionally, operation of the circuitry of FIGS. 4, 5 will include discussion of the waveforms EOC, CL1, CL2 whereby the ∅1, ∅2 waveforms and the variable Stop bit time duration, i.e., the time duration between the tenth ∅1 pulse and the next subsequent first ∅1 pulse are generated. Operation of the circuitry of FIG. 5 will be discussed with particular reference to FIGS. 6b, 6c wherein the 1 bit Stop bit time duration of FIG. 6a is modified by the closing of Switches S1, S2 to generate 1½ bit Stop bit time duration and 2 bit Stop bit time duration of FIGS. 6b, 6c. The effect of Switches S1, S2 upon the Stop bit time duration is as noted in Table A.

TABLE A

| Switches | | Stop Bit Time Duration |
|---|---|---|
| S1 | S2 | |
| Open | Open | 1 Bit Time. |
| Do | Closed | 1½ Bit Time. |
| Closed | do | 2 Bit Time. |

With particular reference to FIGS. 7a–7h, 7j–7n, 7p there are illustrated the logic circuit types and their associated truth tables that are utilized in the description of the illustrated embodiment of the present invention. The circuits are well known, are commercially available, and, accordingly, shall not be described in detail since this would not add to an understanding of the present invention. It is, of course, understood that other types of logic configurations could be utilized in implementing the present invention; those shown herein have been found to be advantageous, both with regard to cost and operation. In the description of the operation of the illustrated embodiment certain logic configurations have been assumed. In this regard, a closed arrow shall be equivalent to a ground signal which shall be equivalent to a logical "0" and representative of a positive signal while an open arrow shall be equivalent to a —4.5 volt signal which shall be equivalent to a logical "1" and representative of a negative signal.

With respect to the illustrated logic circuit types all open, i.e., uncoupled, open-arrow inputs float at a negative signal level, i.e., "1," and all grounded open-arrow inputs are at a positive signal level, i.e., "0." Additionally, some logic circut types, e.g., AND Gate 126, may include additional driving, i.e., fan-out, capabilities as required by the particular use. With respect to the illustrated flip-flop logic circuit types, the flip-flops are shown in the set condition with the associated truth tables reflecting an initial clear condition; right hand input side enabled produces a "1" at the left hand output side for a set condition; left hand input side enabled produces a "1" at the right hand output side for a clear condition.

OPERATION OF SERIALIZER (a) After the DATA-to-C operation, as described above, by the coupling of pulse 100 to line 49—see FIG. 4—Shift Register 48 has been loaded, in parallel, with the bits of the output character as received from Communication Terminal Module Controller 18. At this time, the bits of the multi-bit character held in the associated stages of C Register 70 are as noted in Table B. It will be shown that the successive ∅1 pulses 1, 2, 3, . . . 10, as noted in FIG. 6a, shall emit the associated bits from Stage 69' of C' register 71 as noted in Table B.

TABLE B

| Serial ∅1 Pulse Output Stage 69' | 1 | 2 | 3 | 4 | 5 | 6 | 7 | 8 | 9 | 10 |
|---|---|---|---|---|---|---|---|---|---|---|
| Serialized Output Bit DATA-to-C Stage of C Register 70 | STR | 0 | 1 | 2 | 3 | 4 | 5 | 6 | 7 | MKR |
| | 69 | 60 | 61 | 62 | 62 | 64 | 65 | 66 | 67 | 68 |
| Binary | "0" | | DATA Bits "1" or "0" | | | | | | | "1" |

(b) After the loading of Shift Register 48 at the DATA-to-C operation the next subsequent ∅1 pulse on line 110 transfers the contents of C Register 70 into the same ordered stages of C' Register 71, e.g., the contents of Stage 68 of C Register 70 are transferred into Stage 68' of C' Register 71.

(c) The next subsequent ∅2 pulse on line 112 transfers the contents of C' Register 71 to the next ordered stage of C Register 70, e.g., the contents of Stage 68' of C' Register 71 are transferred into Stage 67 of C Register 70.

The serializing operation of Shift Register 48 consists of the successive operations (b), (c) above by the successive coupling of a ∅1 pulse to line 110 and a ∅2 pulse to line 112 whereby the bits of the output character as received character bit parallel from Communication Terminal Module Controller 18 are character bit serially emitted from Stage 69' of C' Register 71 onto serial output character line 114 and thence to Data Set 22 for transmission in a frequency modulated form on Transmission Line 14.

Each output character bit from Shift Register 48 is coupled to line 114 during the time duration between successive ∅1 pulses which time duration is defined as a 1 bit time. Accordingly, with ∅1 pulses coupled to line 112 of Shift Register 48 the output character bits are emitted therefrom at uniform 1 bit time durations. The present invention involves the addition of the Variable Stop Bit Time Generator 74 of FIG. 5 whereby the Stop bit is coupled to line 114 over the Stop bit time duration, i.e., the time duration over which the Stop bit (STP) is coupled to line 114. This effecting of the Stop bit time duration is accomplished by the operation of Switches S1, S2 as noted in Table A above for the generation of the variable Stop bit time durations: 1 bit time, 1½ bit time, 2 bit time.

GENERATION OF VARIABLE STOP BIT TIMES

As stated above, the DATA-to-C operation loads the stages of C Register 70 with the associated bits noted in Table B: output character data bits $2^0$–$2^7$ in Stages 60–67, respectively; a Marker bit "1" in Stage 68; a Start bit "0" in Stage 69. The DATA-to-C operation, through the C Register Clear Decoder 78 circuitry of blocks 90, 91, also sets Enable Output Clock (EOC) Flip-Flop 94 whereby the $\emptyset 1$, $\emptyset 2$ generating circuitry, as driven by the CTMC Transmit Clock in Communication Terminal Module Controller 18 that is coupled to line 92 of FIG. 5, is initiated. The output of C Register Clear Decoder 78 at Inverter 91 allows the $\emptyset 1$, $\emptyset 2$ Clock 76 to be enabled on the next first positive-going cycle of the CTMC Transmit Clock coupled to line 92. The first $\emptyset 1$ pulse from And Gate 168 that is generated sets the Enable Output Clock Flip-Flop 94 by way of line 137 coupling a "1" or negative signal from its left-hand output side by means of line 140 to a first input of AND Gate 138. The other input of AND Gate 138 is by way of line 136 and is controlled by the polarity of the CTMC Transmit Clock pulse on line 92 and the set or clear condition of CL1 Flip-Flop 120. On the first $\emptyset 1$ pulse, the same $\emptyset 1$ pulse which sets Enable Output Clock Flip-Flop 94, the start bit STR in Stage 69' of C' Register 71 is cleared coupling a negative signal to AND Inverter 142 by means of line 144. With a negative Disable Send Data signal coupled to line 146, AND Gate 142 couples a positive signal to serial output data line 114 indicating a Start bit of "Space." At each subsequent $\emptyset 1$ pulse time, the contents of Stage 69 of C Register 70 are transferred into Stage 69' of C' Register 71 while on each $\emptyset 2$ pulse time the contents of the stages of C' Register 71 are shifted 1 bit position right-wise into the next stage of C Register 70. At each $\emptyset 1$ pulse time AND Gate 142 is either enabled or disabled by the set or clear state of Stage 69' of C' Register 71 whereby the output signal coupled to serial output data line 114 by AND Gate 142 is as follows:

Negative signal for a "1" Mark bit,
Positive signal for a "0" Space bit.

When Shift Register 48 has shifted the Marker bit, as originally held in Stage 68 of C Register 70, into Stage 69 of C Register 70, C Register 70 is clear except for Stage 69 of C Register 70 which remains set. The C Register Clear Decoder 78 detects when bits $2^0$–$2^8$ are clear, that is when all signals on lines 80–88 of Shift Register 48 go negative, whereby the output of C Register Clear Decoder 78 on line 93 goes positive enabling the clearing of Enable Output Clock Flip-Flop 94. That is, on the first $\emptyset 1$ pulse afer C Register 70 becomes clear, i.e., the tenth $\emptyset 1$ pulse of the character, Enable Output Clock Flip-Flop 94 is cleared. The negative output of Enable Output Clock Flip-Flop 94 by way of AND Inverter 176, line 148, AND Gate 174 and line 150 disables the setting of CL1 Flip-Flop 120. The positive output on the right-hand output side of CL1 Flip-Flop 120, by way of line 132 prevents the production of another $\emptyset 2$ pulse on line 112. This provides, by way of line 154 and CL2 Flip-Flop 122, a positive disable to CL1 Flip-Flop 120 whereby the $\emptyset 1$, $\emptyset 2$ generating circuitry cannot initiate another timing sequence until the expiration of the Stop bit time duration. This sequence continues through all the characters of the multi-character message until the End Of Transmission (EOT) character is detected. The $\emptyset 1$, $\emptyset 2$ Clock 76 and Shift Register 48 function in the normal manner except that when Shift Register 48 is cleared $\emptyset 1$, $\emptyset 2$ Clock 76 is turned off by Decoder 78 and Communication Terminal 21 remains in the Mark condition until another External Function Word is received from Communication Terminal Module Controller 18.

The $\emptyset 1$, $\emptyset 2$ Clock 76 logic of FIG. 5 operates in the following manner. At the leading edge of the first positive half cycle of the CTMC transmit clock on line 92 the output of Inverter 160 goes negative causing Single Shot 162 to produce a negative pulse on its output line 164. Assuming that there is an output character loaded in C Register 70 and that the Stop bit time duration has expired, CL1 Flip-Flop 120 is set. Upon the next negative half cycle of the CTMC transmit clock on line 92 Single Shot 124 produces a negative pulse at the input of AND Gate 126. As CL1 Flip-Flop 120 is already set, the negative signal on line 127 sets CL2 Flip-Flop 122 and along with the output of CL1 Flip-Flop 120 enables AND Gate 168 by way of lines 170, 172 whereby AND Gate 168 produces a $\emptyset 1$ pulse on its output line 110. At this time, only a $\emptyset 1$ pulse is produced during the first cycle from the CTMC transmit clock applied to line 92.

With CL2 Flip-Flop 122 set, the next positive half cycle of the CTMC transmit clock clears CL1 Flip-Flop 120 by concurrent negative signals on lines 154, 164. When the next subsequent negative half cycle of CTMC transmit clock occurs, Single Shot 124 couples a negative signal by way of its output line 125 to AND Gate 126 which couples a negative signal to its output lines 127, 128. As CL1 Flip-Flop 120 is in a clear state AND Inverter 130 is enabled by the concurrent application of negative signals on its input lines 128, 132 which, through Inverter 134 and line 136, causes AND Gate 138 to couple a $\emptyset 2$ pulse to its output line 112 AND Gate 138, by the coupling of a negative signal to one of its inputs by line 136, is caused to couple a $\emptyset 2$ pulse to its output line 112 whenever Enable Output Clock Flip-Flop 94 is set coupling a negative signal to the other input by way of line 140. This enabling of AND Gate 138 by set Enable Output Clock Flip-Flop 94 occurs except at the end of an output character transfer when the generation of a $\emptyset 2$ pulse is disabled by the clearing of Enable Output Clock Flip-Flop 94.

The $\emptyset 1$, $\emptyset 2$ clock circuitry continues to operate as described above until the output character in C Register 70 has been shifted out with C Register 70 being cleared. When C Register 70 is cleared and the Enable Output Clock Flip-Flop 94 is cleared by the next $\emptyset 1$ pulse following the clearing of C Register 70 the $\emptyset 1$, $\emptyset 2$ Clock 76 is disabled. The $\emptyset 1$, $\emptyset 2$ Clock 76 cannot be restarted until the Stop bit time duration expires and the next output character is received from Communication Terminal Module Controller 18 whereby Enable Output Clock Flip-Flop 94 is again set by Decoder 78.

As indicated by FIG. 6a after the occurrence of the tenth $\emptyset 1$ pulse the output character bit coupled to serial output data line 114 by AND Gate 142 is the Stop bit. As stated previously, the bit time duration that any bit is held on line 114 is the interval between successive $\emptyset 1$ pulses. As illustrated in FIGS. 4, 5 the two conditions for generating a $\emptyset 1$ pulse are:

CL1 Flip-Flop 20 is set.
CTMC transmit clock pulse on line 92 is negative.

Of these two conditions, the setting of CL1 Flip-Flop 120 is the controllable condition whereby the setting of CL1 Flip-Flop 120 is the means for controlling *minimum* Stop bit time duration. The conditions for setting CL1 Flip-Flop 120 includes enabling AND Gate 174 which has three input lines 148, 170, 172; whose input lines 170, 172 when disconnected float as a negative signal input. The operation of Switches S1, S2 associated with lines 170, 172 provide the means for providing selectively variable Stop bit time durations—see Table A. As indicated by the illustrated circuitry of FIGS. 4, 5 there is no maximum Stop bit time duration, the loading of the next subsequent output character in Shift Register 48 and the resulting setting of Enable Output Clock Flip-Flop 94 satisfies the conditions for resetting CL1 Flip-Flop 120 and terminating the Stop bit time duration.

GENERATION OF ONE BIT STOP BIT TIME DURATION

For the generation of a 1 bit Stop bit time duration, Switches S1, S2 are Open—see Table A. At the beginning of the serialization of the output character held in C Register 70, Decoder 78, through blocks 90, 91, sets Enable Output Clock Flip-Flop 94 which, in turn, enables AND Gate 174 by way of AND Inverter 176 and line 148. The enabling of AND Gate 174 satisfies one of the conditions for setting CL1 Flip-Flop 120 by way of line 150. As CL2 Flip-Flop 122 was initially in a clear state (a condition for the setting of CL1 Flip-Flop 120) CL1 Flip-Flop 120 will be set by the leading edge of the first positive CTMC transmit clock positive pulse that follows the setting of Enable Output Clock 94. With CL1 Flip-Flop 120 set the remaining condition for enabling AND Gate 168, the output of which is the $\emptyset 1$ waveform, is the next subsequent negative CTMC transmit clock pulse. AND Gate 168 couples a negative $\emptyset 1$ pulse to its output line 110 for the duration of the output of Single Shot 124. As illustrated in FIG. 6a the subsequent clearing and resetting of CL1 Flip-Flop 120 occurs on alternate positive CTMC transmit clock pulse phases. Consequently, the minimum Stop bit time duration is a normal 1 bit time cycle for CL1 Flip-Flop 120.

GENERATION OF ONE ONE-HALF BIT STOP BIT TIME DURATION

At the beginning of the serialization of the output character held in C Register 70, Decoder 78, through blocks 90, 91, sets Enable Output Clock Flip-Flop 94 enabling AND Gate 174 by way of AND Inverter 176 on line 148. Generation of successive $\emptyset 1$, $\emptyset 2$ pulses is as previously described and with particular reference to FIG. 6a continues through the serialization of the output character on serial output data line 114 until the Stop bit is transferred into Stage 69' of C' Register 71, whereupon, with C Register 70 being cleared, Decoder 78, through blocks 90, 91, clears Enable Output Clock Flip-Flop 94. The clearing of Enable Output Clock Flip-Flop 94 at the tenth $\emptyset 1$ pulse noted as time $t_{10}$ in FIGS. 6a, 6b, 6c initiates the Stop bit time duration as noted in the above discussion of the generation of the 1 bit Stop bit time duration.

With particular reference to FIG. 6b there are illustrated the timing relationships of the pertinent signal waveforms for the generation of the 1½ bit Stop bit time duration. For the generation of the 1½ bit Stop bit time duration, Switch S1 is open and Switch S2 is closed as illustrated in Table A. Switch S2 couples AND Gate 174 input line 172 to line 173 and the right-hand output (clear) side of DL1 Flip-Flop 180. Accordingly, AND Gate 174 is disabled whenever DL1 Flip-Flop 180 is set. The conditions for setting DL1 Flip-Flop 180 are:

Enable Output Clock 94 is cleared,
CL2 Flip-Flop 122 is set, and
CL1 Flip-Flop 120 is cleared.

Additionally, DL1 Flip-Flop 180 remains in the set condition until cleared by the following conditions:

A negative CTMC transmit clock pulse is coupled to line 92, and DL3 Flip-Flop 182 is set, which requires;

(a) DL1 Flip-Flop 180 is set,
(b) DL2 Flip-Flop 184 is clear, and
(c) A positive CTMC transmit clock pulse is coupled to line 92.

The timing diagram of FIG. 6b includes the timing diagrams for DL1 Flip-Flop 180 and DL3 Flip-Flop 182 and the resulting 1½ bit Stop bit time duration occasioned by the resulting control of CL1 Flip-Flop 120 and CL2 Flip-Flop 122. FIG. 5 illustrates that AND Gate 174 is disabled from the time that Enable Output Clock 94 is cleared at time $t_{10}$ by the shifting of the Stop bit into Stage 69' of C' Register 71 until DL1 Flip-Flop 180 is cleared and the conditions for enabling AND Gate 168 have been satisfied which time duration is equal to 1½ bit time.

GENERATION OF TWO BIT TIME STOP BIT TIME DURATION

Operation of the circuitry of FIGS. 4 and 5 for the generation of the 2 bit Stop bit time duration sequence is, as with the 1½ bit Stop bit time generation sequence of FIG. 6b similar to that of the 1 bit Stop bit time generation of FIG. 6a between the time $t_0$ and $t_{10}$. With particular reference to FIG. 6c there are illustrated the timing diagrams for the circuitry associated with the generation of the 2 bit Stop bit time duration generation scheme. For the generation of the 2 bit Stop bit time duration generation, Switches S1, S2 are closed, see Table A, providing a third condition, as compared to the two conditions discussed with respect to the 1½ bit Stop bit time duration generation scheme, for enabling AND Gate 174 and consequently AND Gate 168. The third condition for enabling AND Gate 174, added by the closing of Switch S1, and of course the closing of Switch S2, concerns the clearing of DL2 Flip-Flop 184. An inspection of the block diagram of FIG. 5 indicates that DL2 Flip-Flop 184 is set by the following conditions:

DL3 Flip-Flop 182 is set, and

A negative CTMC transmit clock pulse is coupled to line 92. Additionally, it is apparent that DL2 Flip-Flop 184 remains in the set condition until the following conditions occur:

DL3 Flip-Flop 182 is cleared, and

A negative CTMC transmit clock pulse is coupled to line 92. As with FIGS. 6a, 6b the Stop bit time duration commences at time $t_{10}$, i.e., at the tenth $\emptyset 1$ pulse, when Enable Output Clock Flip-Flop 94 is cleared by Decoder 78 through blocks 90, 91. As illustrated in FIG. 6c the Stop time duration continues from time $t_{10}$ until DL2 Flip-Flop 184 is cleared and the conditions for enabling AND Gate 174, and of course AND Gate 168, are satisfied.

Applicant has in his illustrated embodiment indicated one method for providing selectively variable Stop bit time durations in information transfer between computer sites in a multi-computer data processing system. Although the illustrated Stop bit time durations are limited to 1 bit time, 1½ bit time and 2 bit time, it is to be appreciated that applicant's inventive concept is not to be limited to these specific Stop bit times but is to extend to any Stop bit time duration generating apparatus that incorporates the inventive concept of the present invention. It is, therefore, understood that suitable modifications may be made in the structure as disclosed provided such modifications come within the spirit and scope of the appended claims. Having, now, fully illustrated and described my invention, what I claim to be new and desire to protect by Letters Patent is set forth in the appended claims.

1. A communication system providing selectively variable Stop bit time durations for establishing corresponding minimum time durations between successive multibit characters in a multi-character message, the combination comprising:

serializer means for transmitting an $m$-bit character in a character bit serial format, said $m$-bit character including an initial Start bit for indicating the beginning of the serial transmission of said m-bit character and a terminating Stop bit for indicating the ending of the serial transmission of said m-bit character, the serial transmission of each of said m-bits normally occurring over the same one bit time duration, the Stop bit time duration being the time duration said serializer, after transmitting the Stop bit of a message character, is disabled from causing the Start bit of the next subsequent character to be transmitted;

clock means for generating clock pulse signals, successive pulses being of a one bit time duration for producing a one bit time first Stop bit time duration, said clock means including a gate means for coupling said clock pulse signals to said serializer means;

generator means coupled to said clock means for producing variable Stop bit time durations, said generator means including:

intercoupled first and second control means;

Stop bit gate means; and, first coupling means for selectively coupling said first control means to said Stop bit gate means for producing a second Stop bit time duration.

2. The combination of claim 1 wherein said generator means further includes:

third control means intercoupled to said first and second control means; and second coupling means selectively coupling said third control means to said Stop bit gate means for producing a third different Stop bit time duration.

3. A communication system providing selectively variable Stop bit time durations for establishing corresponding minimum time durations between successive multi-bit characters in a multi-character message which is coupled to a communication link by a data processing system, the combination comprising:

a communication link for intercoupling first and second data processing systems;

serializer means for coupling to said communication link an m-bit character in a character bit serial format, said m-bit character including an initial Start bit for indicating the beginning of the serial transmission of said m-bit character on said communication link and a terminating Stop bit for indicating the ending of the serial transmission of said m-bit character on said communication link, the serial coupling of each of said m-bits normally occurring over the same one bit time duration, the Stop bit time duration being the time duration said serializer, after coupling the Stop bit of a message character to said communication link, is disabled from causing the Start bit of the next subsequent character to be coupled to said communication link;

clock means for generating ∅1 clock pulse signals, successive ∅1 pulses normally being of a one bit time duration for coupling the Stop bit of said m-bit character to said communication link for a one bit time, first Stop bit time duration, said clock means including a ∅1 gate means for coupling ∅1 clock pulses to said serializer means;

Generator means coupled to said clock means for producing variable Stop bit time durations, said generator means including:

intercoupled first and second control means;

Stop bit gate means coupled to said clock means;

first coupling means for selectively coupling said first control means to said Stop bit gate means for producing a second Stop bit time duration.

4. The combination of claim 3 wherein said generator means further includes:

third control means intercoupled to said first and second control means;

second coupling means selectively coupling said third control means to said Stop bit gate means for producing third different Stop bit time duration.

5. The combination of claim 4 further including:

decoder means coupled to said serializer means, said clock means and said generator means for enabling said ∅1 gate means when said serializer means is loaded with an n-bit character and for disabling said ∅1 gate means when said serializer means is cleared of said m-bit character except for said Stop bit.

6. A communication system providing selectively variable Stop bit time durations for establishing corresponding minimum time durations between successive multi-bit characters in a multi-character message which is coupled to a communication link by a data processing system, the combination comprising:

a communication link for intercoupling first and second data processing systems;

serializer means for coupling to said communication link an m-bit character in a character bit serial format, said m-bit character including an initial Start bit for indicating the beginning of the serial transmission of said m-bit character on said communication link and a terminating Stop bit for indicating the ending of the serial transmission of said m-bit character on said communication link, the serial coupling of each of said m-bits normally occurring over the same one bit time duration, the Stop bit time duration being the time duration said serializer, after coupling the Stop bit of a message character to said communication link, is disabled from causing the Start bit of the next subsequent character to be coupled to said communication link;

clock means for generating first and second phase clock pulse signals, successive pulses of each phase normally being of a one bit time duration for coupling the bits of said m-bit character to said communication link for producing a one bit time first Stop bit time duration, said clock means including:

a first phase AND Gate for coupling a first phase clock pulse to said serializer means and to a decoder means;

a second phase AND Gate for coupling a second phase clock pulse to said serializer means;

said decoder means coupled to said serializer means and said clock means for enabling said second phase AND Gate means when said serializer means is loaded with an n-bit character;

generator means coupled to said clock means for controlling the enabling of said first and second phase AND Gate means, said generator means including:

intercoupled first and second flip-flops;

Stop bit AND Gate means; and first coupling means for selectively coupling said first flip-flop to said Stop bit AND Gate for producing a second Stop bit time duration.

7. The combination of claim 6 wherein said generator means further includes:

a third flip-flop intercoupled with said first and second flip-flops; and, second coupling means for selectively coupling said third flip-flop to said Stop bit AND Gate, the first and second coupling means concurrently selectively coupling said first and third flip-flops, respectively, to said Stop bit AND Gate for producing a third Stop bit time duration.

References Cited

UNITED STATES PATENTS 3,153,776 10/1964 Schwartz.
3,350,697 10/1967 Hirvela.
3,351,917 11/1967 Shimabukuro.

PAUL J. HENON, Primary Examiner

H. E. SPRINGBORN, Assistant Examiner